United States Patent [19]

Shimizu et al.

[11] Patent Number: 5,065,548
[45] Date of Patent: * Nov. 19, 1991

[54] SURFACE TREATING TAPE CARTRIDGE AND SURFACE TREATING MACHINE

[75] Inventors: Tatsuo Shimizu, Sendai; Kazunori Ozawa, Tomiya; Kenji Yazawa, Shiogama; Kazunori Tani, Machida, all of Japan

[73] Assignee: Speedfam Company, Ltd., Japan

[*] Notice: The portion of the term of this patent subsequent to Nov. 19, 2008 has been disclaimed.

[21] Appl. No.: 362,211

[22] Filed: Jun. 6, 1989

[30] Foreign Application Priority Data

Jun. 6, 1988 [JP] Japan .................. 63-138611

[51] Int. Cl.⁵ .......................................... B24B 21/02
[52] U.S. Cl. ...................... 51/154; 51/141; 51/145 R; 51/135 R; 51/150
[58] Field of Search ............... 51/62, 150, 281 R, 328, 51/281 SF, 135 R, 154, 155, 237, 135 BT, 136, 140, 141, 142, 143, 144, 145 R, 145 T, 146, 148, 149, 151, 152; 360/33.1, 85; 242/55.19 A

[56] References Cited

U.S. PATENT DOCUMENTS

| 4,104,686 | 1/1978 | Hashimoto | 242/55.19 A |
| 4,347,689 | 9/1982 | Hammond | 51/181 SF |
| 4,408,241 | 10/1983 | Ogawa | 360/137 |
| 4,535,567 | 8/1985 | Seaborn | 51/140 |
| 4,671,018 | 6/1987 | Ekhoff | 51/140 |
| 4,796,115 | 1/1989 | Ohshima et al. | 360/85 |
| 4,796,116 | 1/1989 | Kwon et al. | 360/85 |
| 4,796,387 | 1/1989 | Johnson | 51/62 |
| 4,807,605 | 2/1989 | Kwon | 360/85 |
| 4,855,856 | 8/1989 | Matsuoka | 360/128 |

FOREIGN PATENT DOCUMENTS 136764  6/1986  Japan .

Primary Examiner—James G. Smith
Assistant Examiner—Blynn Shideler
Attorney, Agent, or Firm—Allegretti & Witcoff, Ltd.

[57] ABSTRACT

Described herein is a surface treating tape cartridge packaging a surface treating tape in a casing ready for loading the tape on a surface treating machine, and a surface treating machine capable of automatically loading a surface treating tape in position from such a cartridge, the tape cartridge being basically composed of: a casing formed by separably joined upper and lower halves; and a pair of reels carrying a roll of surface treating tape and rotatably accommodated between the upper and lower halves of the casing.

17 Claims, 6 Drawing Sheets

SURFACE TREATING TAPE CARTRIDGE AND SURFACE TREATING MACHINE

BACKGROUND OF THE INVENTION

1. Field of the Invention

This invention relates to a surface treating tape cartridge useful for surface treatment of magnetic disks, magnetic tapes and like media, and a surface treating machine using the surface treating tape cartridge.

More specifically, the present invention contemplates to facilitate handling of surface treating tapes by providing a surface treating tape cartridge packaging therein a pair of reels carrying a winding of a tape to be used for surface treatment of magnetic disks, magnetic tapes and like media.

Further, the invention concerns a surface treating machine employing a cartridge of the nature mentioned above, for surface treatment of a work, the machine including a tape drawing mechanism for drawing out the surface treating tape in the cartridge to a predetermined position, and a tape pressing mechanism for pressing the tape against the work, thereby loading the surface treating tape automatically in position on the machine in a facilitated manner to improve the working efficiency and productivity of the surface treating process.

2. Prior Art

The technology of surface treatment has thus far been adopted in various fields. For example, in case of hard disks and floppy disks which are widely used as a memory medium for computers, it has been required to impart a certain degree of surface coarseness to substrates of magnetic disks or to base films by a surface treatment from the standpoint of performance quality in travel and durability. In case of optical disks to be used on optical systems, the substrates need a grinding or polishing treatment as they are required to have a smooth surface prior to formation of a recording layer. Further, in case of magnetic tapes, especially in case of vapor deposition tapes, it is necessary to give a finishing surface treatment to the surfaces of base films also from the standpoint of performance quality in travel. The surfaces of liquid crystal cells to be used for liquid-crystal television screens, for example, likewise need a lapping treatment in a particular direction for orientation of the liquid crystal material.

In this manner, the technology of surface treatment has been in use in a broad range of industrial fields. In actual applications, for example, when giving a certain surface treatment to a work, it has been the general practice to employ a surface treating tape, e.g., a lapping tape or a cleaning tape, which is simply wound on a reel, setting the tape in position on a machine by manually drawing out the tape and threading it through and around a large number of guide rollers.

However, the job of threading a surface treating tape through and around a large number of guide rollers is very complicated and time consuming. Besides, the manual tape threading operation often gives rise to the problems resulting from false tape setting, in addition to a problem that handling of the tape itself is not easy.

SUMMARY OF THE INVENTION

In view of the foregoing situations, the present invention has as its object the provision of a surface treating machine which is capable of setting the surface treating tape into a predetermined position or in a path of travel automatically in a simplified manner, for enhancing the working efficiency and productivity of the surface treating operation.

In accordance with the present invention, there is provided a surface treating tape cartridge including a casing composed of separably joined upper and lower halves and a pair of tape reels carrying a winding of surface treating tape and rotatably accommodated between the upper and lower halves of the cartridge casing.

In accordance with the present invention, there is also provided a surface treating machine which is capable of automatically loading a surface treating tape in a cartridge as mentioned above into a position ready for treating the surface of a workpiece set on the machine, which machine including a tape drawing mechanism for drawing out part of the surface treating tape from the cartridge to a predetermined position on the machine, a guide roller mechanism for setting and transporting the surface treating tape in and along a predetermined path of travel through a work treating position, and a tape pressing mechanism for pressing the surface treating tape against the surface of the work.

The surface treating tape cartridge of the present invention which packages therein a surface treating tape on a pair of reels facilitates handling of the tape to a significant degree.

When the cartridge packages a lapping tape or a cleaning or wiping tape as the surface treating tape, it is useful for a surface grinding or cleaning treatment.

Upon setting the cartridge on a surface treating machine, the surface treating tape in the cartridge is drawn out automatically to a predetermined position by a tape drawing mechanism. The surface treating tape is then pressed against the surface of a work by a tape pressing mechanism to effect a surface treatment.

The above and other objects, features and advantages of the invention will become apparent from the following description and the appended claims, taken in conjunction with the accompanying drawings which show by way of example a preferred embodiment of the invention.

DESCRIPTION OF PREFERRED EMBODIMENTS

Figure 1:
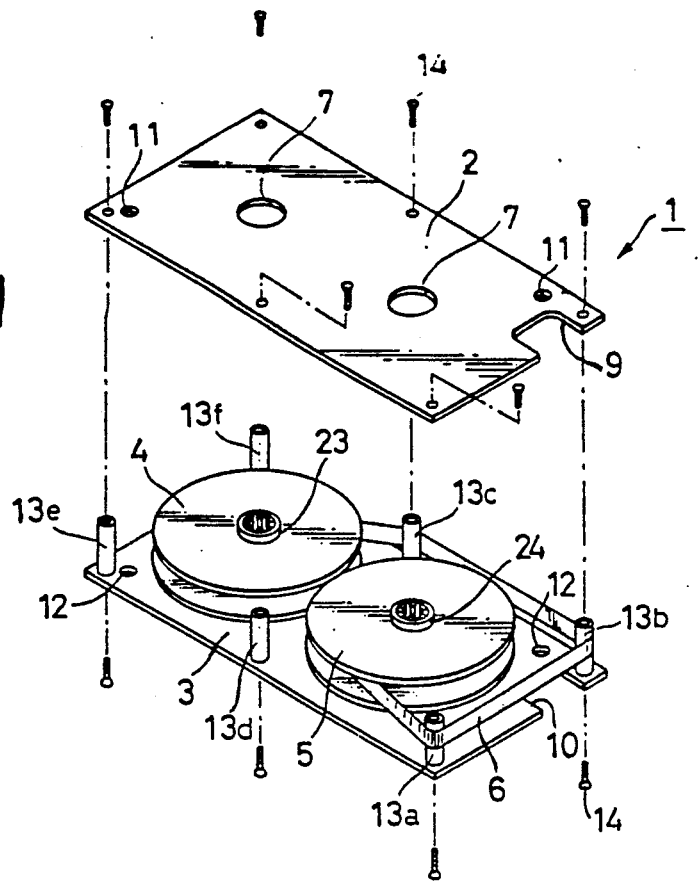
FIG. 1 is an exploded perspective view of a surface treating tape cartridge according to the present invention.

Now, the invention is described more particularly by way of a preferred embodiment shown in the drawings.

Figure 2:
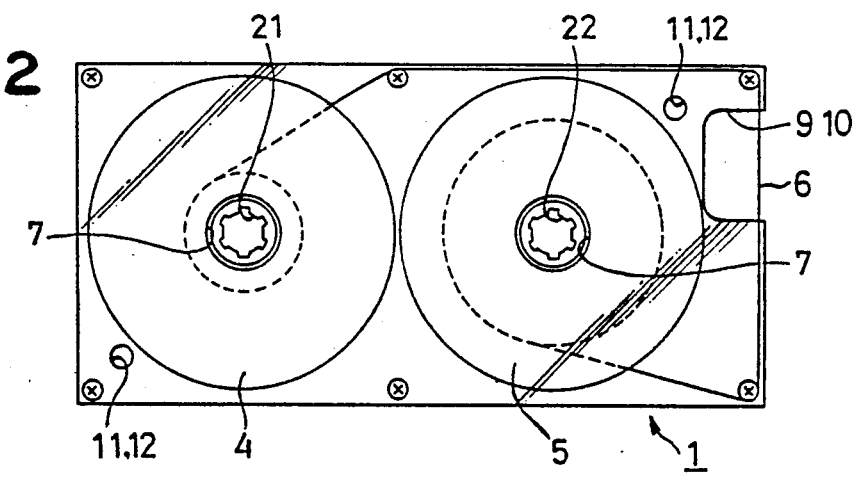
FIG. 2 is a plan view of the cartridge of FIG. 1.
Figure 3:
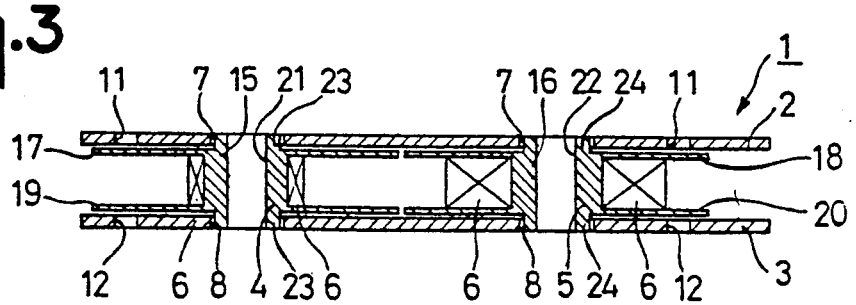
FIG. 3 is a longitudinal sectional view of the same cartridge.
Figure 4:
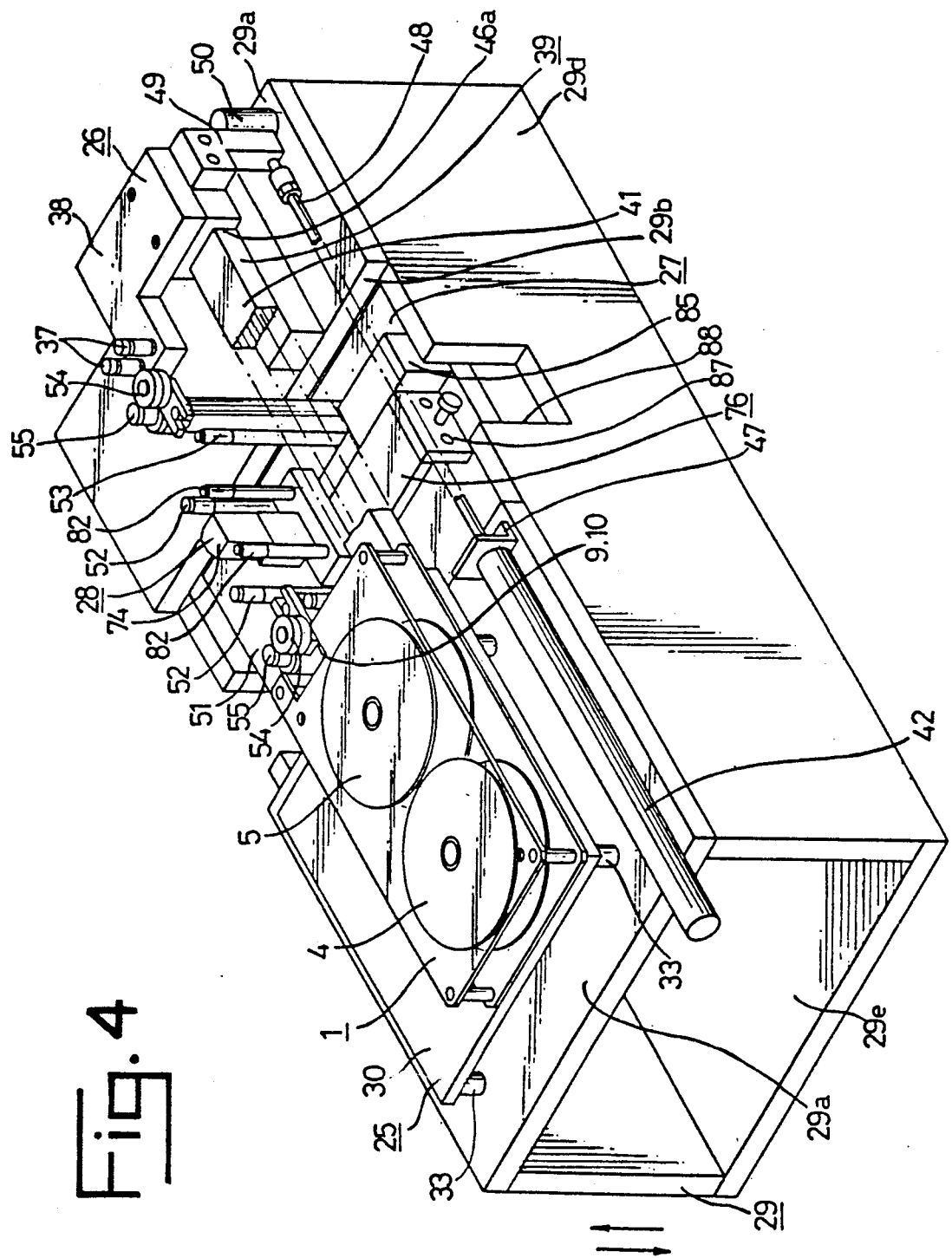
FIG. 4 is a perspective outer view of a surface treating machine with mechanisms for automatically loading the surface treating tape in the cartridge according to the present invention.
Figure 5:
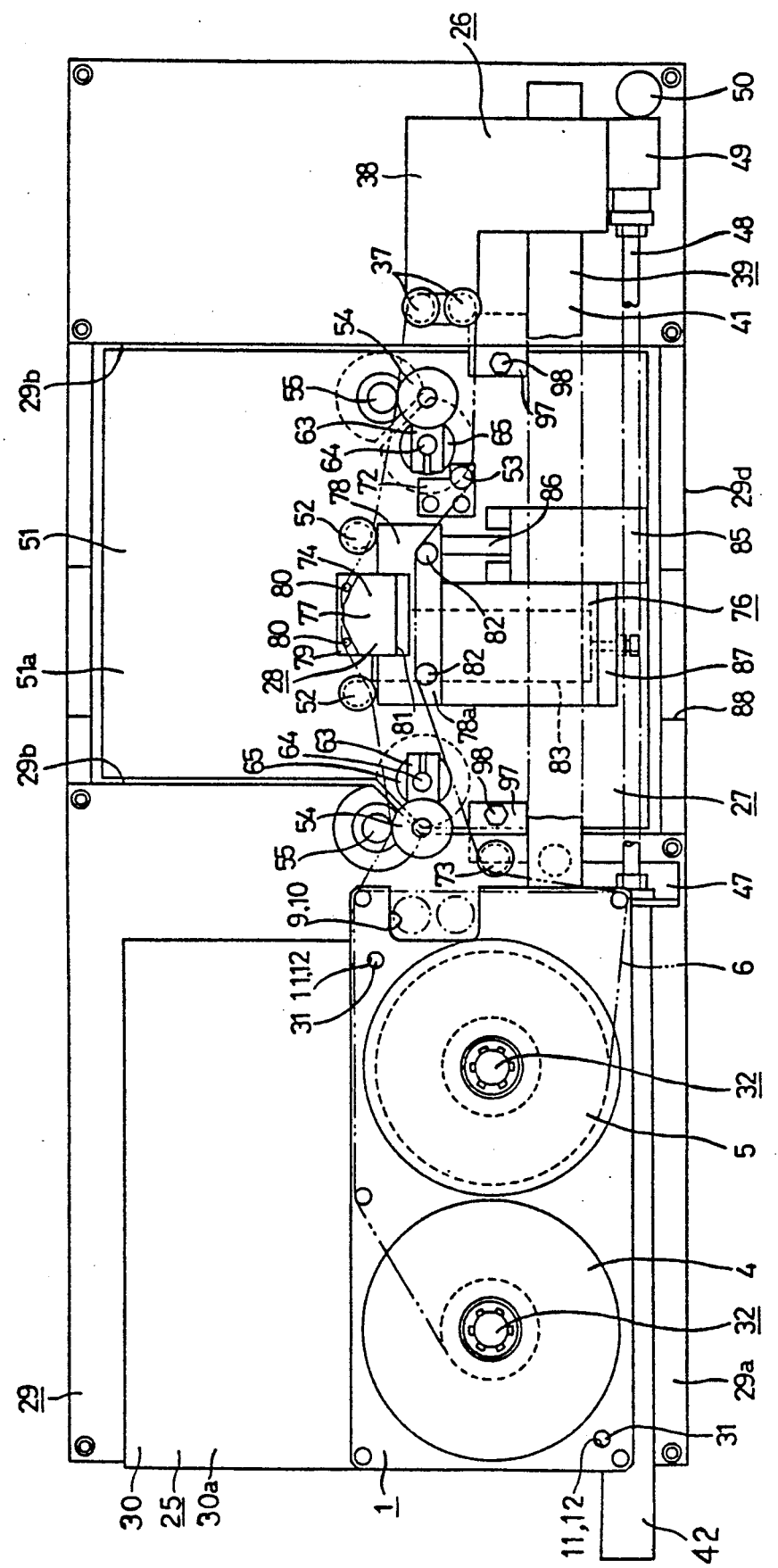
FIG. 5 is a plan view of the surface treating machine.

The surface treating tape cartridge according to the invention has a construction as illustrated in FIGS. 1 to 3. More specifically, the surface treating tape cartridge, indicated at 1, has a casing composed of upper and lower halves 2 and 3 which are separably joined together through a number of spacing support columns, a pair of tape reels 4 and 5 rotatably accommodated between the upper and lower halves 2 and 3, and a surface treating tape 6 is passed between and wound on the tape reels 4 and 5.

The upper and lower halves 2 and 3 of the cartridge 1, which rotatably encase a pair of tape reels 4 and 5 carrying the surface treating tape 6, are formed, for example, by injection molding of plastics or synthetic resin material into a generally rectangular plate-like shape in plan view. The upper and lower halves 2 and 3 are provided with bores 7 or 8 in predetermined spaced positions, which permit rotational movements of the paired tape reels 4 or 5 therein. Further, at one of their short sides, the upper and lower halves 2 and 3 are provided with notched or indented portions 9 and 10 to receive loading rollers therein as will be described hereinlater. These notches or indented portions 9 and 10 are formed by cutting off part of the upper and lower halves 2 and 3 for the purpose of preventing collision of the loading rollers against the cartridge 1. The upper and lower halves 2 and 3 are further provided with positioning holes 11 or 12 one in a position close to the notches 9 and 10 and the other one in a diagonally opposite position, the positioning holes 11 and 12 for fixing the surface treating tape cartridge 1 in a predetermined position on a surface treating machine as will be described hereinlater.

These positioning holes 11 and 12 are fittingly engageable with positioning pins on the surface treating machine to hold the surface treating tape cartridge fixedly in position.

The upper and lower halves 2 and 3 are identical in shape, so that they can be used as either an upper half or a lower half, namely, the cartridge 1 can be used upside down.

The upper and lower halves 2 and 3 which are formed in the above-described manner are abuttingly joined together by bolts through cylindrical support columns 13a to 13f of a predetermined length. Each one of the just-mentioned support columns 13a to 13f is axially provided with a female screw hole for threaded engagement with a bolt 14.

The paired tape reels 4 and 5 which are accommodated between the upper and lower halves 2 and 3 are provided with upper and lower flanges 17 or 18 and 19 or 20 in positions proximate to the opposite ends of the respective hub portions 15 and 16 for winding the surface treating tape 6 regularly on the hub portions 15 and 16 at the center axes. Namely, the upper and lower flanges 17 (18) and 19 (20) which restrict the width of the surface treating tape 6 ensure regular winding of the tape.

The hub portions 15 and 16 are axially provided with bladed portion insert holes 21 and 22 which are engageable with bladed portions at the upper ends of hub drive shafts of the surface treating machine. Projections 23 and 24 are provided at the opposite ends of the hub portions 15 and 16, respectively, in such a manner that they project slightly outward from the faces of the upper and lower flanges 17 or 18 and 19 or 20. These projections 23 and 24 fit in the bores 7 and 8 in the upper and lower cartridge halves 2 and 3, so that the tape reels 4 and 5 are freely rotatable in the cartridge 1.

Of the above-described paired tape reels 4 and 5, the one which is located on the side of the notches 9 and 10 in the upper and lower halves 2 and 3 serves as a supply reel 5 while the other one on the opposite side serves as a take-up reel 4.

The surface treating tape 6 which is passed between and wound on the paired tape reels 4 and 5 is led out of the supply reel 5 toward the notches 9 and 10 around the outer side of the support columns 13a and 13b, which are located on the side of the notches 9 and 10 in parallel relation with each other, and wound on the take-up reel 4 around a support column 13c which is located substantially at a median position of the upper and lower halves 2 and 3. Accordingly, the surface treating tape 6 which is fed from the supply reel 5 travels along the side with the notches 9 and 10 before it is wound on the take-up reel 4.

In this instance, a lapping tape or a cleaning or wiping tape is useful as the surface treating tape 6. The lapping tape has abrasive grains fixedly secured on its surface for grinding surfaces of base films or substrates of magnetic disks such as hard disks and floppy disks. It is also used for grinding/texturing/burnishing/polishing/wiping surfaces of substrates of optical disks prior to formation of recording layer, surfaces of base films of magnetic tapes, or surfaces of liquid crystal cells for liquid crystal monitor screens. On the other hand, the cleaning tape is usually made of a soft paper pad, fiber or felt, and used, for example, for cleaning off the polishing powder which remains on the surface of a magnetic disk substrate or base film after a polishing operation. Similarly, the wiping tape which is made of a soft paper pad, fiber or felt is used for wiping off the polishing powder which remains on the surface of a magnetic disk substrate or base film after a polishing operation.

When a surface treating tape 6 to be used for a polishing or cleaning operation is provided in the form of a cartridge having the tape wound on a pair of reels 4 and 5 in the above-described manner, the handling of the surface treating tape 6 itself becomes extremely easy. For instance, the surface treating tapes 6 which have been used for a treatment can be removed from the machine without touching the contaminated tape surfaces with hands, coupled with an advantage of simplified storage and administration of the tapes 6.

It is to be understood that various alterations and modifications can be added to the above-described surface treating tape cartridge according to the invention, without departing from the technical concept of the invention. For example, although the upper and lower halves 2 and 3 of the surface treating tape cartridge of this embodiment are each simply of a rectangular plate-like shape, they may be arranged to form a frame body of a cartridge which has openings on the lower side in the fashion of an ordinary tape cassette.

Now, the description is directed to a surface treating machine which is adapted to perform a surface treating operation by the use of the above-described surface treating tape cartridge of the invention.

As shown in FIGS. 4 through 7, the surface treating machine is mainly constituted by: a cartridge mount section 25 for mounting a surface treating tape cartridge 1; a tape drawing mechanism 26 for drawing out part of the surface treating tape 6 in the cartridge 1 to a predetermined position; a guide roller unit section 27 for setting the drawn-out surface treating tape in position on the machine; and a tape pressing mechanism 28 for pressing the surface treating tape against a work.

In this instance, the cartridge mount section 25 and the tape drawing mechanism 26 are mounted on a main surface 29a of a rectangular housing 29. The guide roller unit section 27 is received in an opening 29b which is provided in a center portion of the housing 29, for upward and downward movements therein. Further, the tape pressing mechanism 28 is supported on the guide roller unit section 27.

The cartridge mount section 25 includes a cartridge mount plate 30 which supports thereon the surface treating tape cartridge 1, positioning pins 31 which hold the cartridge 1 in a predetermined position, and a pair of hub drive shafts 32 which are engageable with the hubs of the tape reels 4 and 5 in the cartridge for rotating same.

The cartridge mount plate 30 is of a plate-like form and rigidly mounted on the main surface 29a of the housing 29 through support posts 33 of a predetermined length. Consequently, the travel position of the surface treating tape 6 from the cartridge 1 is determined by the support posts 33. Namely, the surface treating tape 6 travels at a position spaced from the main surface 29a of the housing 29. Further, positioning pins 31 which hold the cartridge 1 in a predetermined position are fixed to the cartridge mount plate 30 by means of bolts or other suitable fixing means. The positioning pins 8 are fitted into the positioning holes 12 on the part of the cartridge 1 to hold same fixedly in position on the cartridge mount plate 30.

The hub drive shafts 32 are provided with bladed portions 34 which are meshingly engageable with the hub portions 32 of the tape reels 4 and 5, rotational shafts 35 which rotate the bladed portions 34, and hollow support columns 36 which receive the rotational shafts 35 therein. The support columns 36 are planted in position through bores which are formed into the main surface 29a of the housing 29, and securely fixed by bolts or other suitable means to the rear surface 29c of the housing on the opposite side of the main surface 29a. The rotational shafts 35 are received in the support columns 36, with the bladed portions 34 attached to the upper ends of the respective rotational shafts 35 for rotation with the latter. The bladed portions 34 are projected above a cartridge mount surface 30a for meshingly engaging same with the tape reels 4 and 5 of the cartridge 1. On the other hand, the other end of each rotational shaft 35, remote from the end with the bladed poriton 34, is protruded into the housing 29 and coupled, for example, with a drive unit like a motor (not shown) for rotating the bladed portion 34.

The tape drawing mechanism 26 includes loading rollers 37 which serve to pull out and transport the surface treating tape 6, a loading roller mount plate 38 for supporting the loading rollers 37, and sliding means 39 for sliding the loading roller mount plate 38.

The loading rollers 37 are mounted on support shafts 40 and respectively rotatable about the axes of the latter. The support shafts 40 are fixedly planted on the loading roller mount plate 38.

The fore end portion of the plate 38, on which the loading rollers 37 are mounted, is movable into the notches 9 and 10 in the cartridge 1, and, for this purpose, formed in a width smaller than that of the notches 9 and 10. Besides, the loading roller mount plate 38 is formed in an angular shape as a whole to avoid collision against a third guide roller 73 which is located on the main surface 29a of the housing 29.

The loading roller sliding means 39 includes a guide rail 41 which supports a sliding loading roller mount plate 38, and a cylinder member 42 which moves the loading rollers 37 to a predetermined position.

The guide rail 41 is constituted by an elongated body with a predetermined width, and fixedly mounted on the main surface 29a of the housing 29 in the longitudinal direction thereof. More specifically, the fore end portion of the guide rail 41, which is located close to the cartridge mount plate 30, is fixed through a cylindrical member 43 of a predetermined height, while the other end is fixed through a support block 44 of the same height as the cylindrical member 43.

The sliding loading roller mount plate 38 is mounted on the guide rail 41. More specifically, a height adjusting plate 45 is attached to the lower side of the loading roller mount plate 38 to hold the loading rollers at the tape travelling level, and a sliding base plate 46 which is in engagement with the guide rail 41 is attached to the height adjusting plate 45. The sliding base plate 46 is provided with a guide groove 46a which is slightly greater in width than the guide rail 41 for engagement therewith. Consequently, the loading roller mount plate 38 is slidable along the guide rail 41 toward and away from the cartridge.

The cylinder member 42 which moves the loading roller mount plate 38 to a predetermined position is mounted in the longitudinal direction of the cartridge mount plate 30. Namely, the cylinder 42 is securely mounted on the main surface 29a of the housing 29 through a bracket 47. As the cylinder 42, there may be employed an ordinary air cylinder or the like.

The fore end of rod 48 of the cylinder 42 is rigidly attached to a rod connecting member 49 which is fixed on one side surface of the height adjusting plate 45. Accordingly, as soon as air is supplied to the cylinder 42, the rod 48 is pushed out of the cylinder, pressing the rod connecting member 49. Whereupon, the loading roller mount plate 38 is slided along the guide rail 41 in a direction of pulling out the tape. Conversely, when air is drawn out of the cylinder 42, the rod 48 is retracted into the cylinder 42 to pull the rod connecting member 49 toward the cartridge. As a result, the loading roller mount plate 38 is moved toward the cartridge mount plate 30, sliding along the guide rail 41.

In this instance, a loading roller positioning member 50 is provided on the main surface 29a of the housing 29 in a position proximate to the other end of the guide rail 41 to stop the loading rollers 37 in a predetermined position. Namely, the loading roller positioning member 50 is located such that the loading rollers 33 take the predetermined position when the rod connecting member 49 comes into abutting engagement with the loading roller positioning member 50.

The provision of the loading roller positioning member 50 prevents the loading roller mount plate 38 from derailing from the guide rail 41 when pushed by the rod 48. On the other hand, when the loading roller mount plate 38 is slided toward the cartridge mount plate 30, it is stopped as soon as its fore end portion comes into engagement with the fore end face of the cartridge mount plate 30.

The guide roller unit section 27 includes a group of guide rollers for transporting the surface treating tape 6, and a guide roller mount plate 51 for supporting the guide rollers.

The above-mentioned group of guide rollers is mainly composed of first guide rollers 52, second guide rollers 53, pinch rollers 54 and capstans 55, which are mounted in predetermined positions on the main surface 51a of the guide roller mount plate 51.

The first guide rollers 52 are located in positions with a predetermined interval therebetween, substantially in a middle portion of the guide roller mount plate 51, namely, in positions close to the position where the surface of work is to be treated. The first guide rollers 52 are rotatably mounted on roller shafts 57 provided at the upper ends of posts 56 which are planted on the guide roller mount plate 51. The length of the posts 56 are so determined that the first guide rollers 52 will come into level with the tape travel position when the guide roller mount plate 51 is moved to a raised position.

The capstan 55 for feeding the tape is located on the tape drawing side and in a position closer to the guide rail 41 of the tape drawing mechanism 26 than the first guide rollers 52. The capstan 55 is provided with a roller portion 58 which pinches and transports the tape in cooperation with the pinch roller 54, a roller drive shaft 59 which rotates the roller portion 58, and a support column 60 which receives the roller drive shaft 59 therein. The support column 60 is planted in a hole which is bored into the guide roller mount plate 51, and securely fixed by bolts to the rear surface 51b on the opposite side of the main surface 51a of the guide roller mount plate 51. The roller portion 58 is attached to the fore end of the roller drive shaft 59 which is rotatably received in the support column 60, and rotatable with the roller drive shaft 59. The other end of the roller drive shaft 59, remote from the roller portion 58, is protruded into the housing 29 and coupled with a drive unit (not shown) which is mounted in the housing 29 for rotating the roller portion 58. Similarly to the first guide roller 52, the length of the support column 60 of the capstan 55 is determined such that the roller portion 58 will come into a position in level with the afore-mentioned tape travel position when the guide roller mount plate 51 is moved to the raised position.

A second capstan 55 identical with the above-described capstan 55 is provided on the main surface 6a of the housing in a position in line with the first capstan 55 in the longitudinal direction of the housing 29. This second capstan 55 has its support column 60 located in a hole bored in the housing 29 and securely fixed to the main surface 29a of the housing 29 by bolts or other suitable means. Similarly, the inner end of the roller drive shaft 59 of the second capstan 55 is coupled with a drive unit like a motor (not shown) which is mounted in the housing for rotating the roller portion 59.

The pinch rollers each 54 include a pinch roller portion 61 to be pressed against the roller portion 58 of the opposing capstan 55 for rotation therewith, a roller shaft 62 which supports the rotating pinch roller portion 61, an arm portion 63 which supports the pinch roller portion 61 and the roller shaft 62, a roller drive shaft 64 for swinging the arm portion 63, and a support column 65 which accommodates the roller drive shaft 64.

The pinch roller portion 61 which holds and transports the lapping tape in cooperation with the roller portion 58 of the rotating capstan 55 is made of rubber or the like, and supported on the roller shaft 62. The roller shaft 62 is located on the arm portion 63 which is rigidly mounted at the outer end of the roller drive shaft 64. The rotating roller drive shaft 64 is received in the support column 65 which is located in a hole bored in the guide roller mount plate 51 and securely fixed by bolts or other suitable means to the rear side 51b of the guide roller mount plate 51.

The inner end of the roller drive shaft 64 (which is located away from the arm portion 63 or which is protruded into the housing 29 through the guide roller mount plate 51) supports a rotary plate 66 which is rotatable integrally with the roller drive shaft 64. The rotary plate 66 is in the form of a flat plate with a notch or an indented portion 67 which is engageable with rod 69 of a pinch roller shifting means 68 like an air cylinder which moves the pinch roller portion 61 into the notch 67.

Upon actuating the pinch roller shifting means 68, the rod 69 of the shifting means 68 is pushed out to engage the notch 67 in the rotary plate 66, and, as the rod 69 is poked out, the rotary plate 66 is turned about the roller drive shaft 64. As a result, the pinch roller 61 is turned away from the capstan 55. In this instance, the pinch roller portion 61 is constantly urged into pressed contact with the roller portion 58.

When the guide roller mount plate 51 is raised into the operating position, the pinch rollers 54 are also lifted to a position in level with the tape travel position.

The second rotating guide roller 53 is located in a position proximate to the pinch roller 54 on the tape drawing side, and supported on a roller shaft 71 which is provided at the outer end of a support column 70. The support column 70 is located on a guide roller mount member 72 which is fixed on the main surface 51a of the guide roller mount plate 51. Similarly, the second guide roller 53 is lifted to a position in level with the tape travel position when the guide roller mount plate 51 is raised to the upper operating position.

A third guide roller 73 which serves to guide the surface treating tape 6 into a predetermined position similarly to the above-described second guide roller 53 is provided on the main surface 29a of the housing 29 in a position closer to the guide rail 41 of the tape drawing mechanism 26 as compared with the second guide roller 53. The third guide roller 73 is mounted on the housing 29 level with the tape travel position.

The tape pressing mechanism 28 includes a tape pressing member 74 which presses the surface treating tape 6 against the surface of a workpiece, a mount plate 75 which mounts the pressing member 74 thereon, and a slider portion 76 for sliding the mount plate 75.

The tape pressing member 74 is provided with a pressing portion 77 of a cubic form which serves to press the surface treating tape 6 against the surface of a work, and a base portion 78 attached to the mount plate 75. The pressing portion 77 has a guide pin mount portion 79 cut out at its fore end to locate a pair of guide pins 80 thereon. The guide pins 80 are positioned parallel with each other to press the surface treating tape 6 uniformly against the surface of the workpiece. Thus, the surface of the workpiece is treated by the surface treating tape portions travelling between these guide pins 80.

The pressing portion 77 is provided with air holes (not shown) for pressing the surface treating tape 6 against the surface of the workpiece by the action of air blasts of a predetermined pressure which is blown out through the air holes in a direction perpendicular to the surface treating tape portions 6 travelling between the guide pins 80. On the side remote from the guide pin mount portion 79, the pressing portion 77 is provided with an indented tape escape portion 81 to prevent its contact with the travelling surface treating tape 6.

The pressing portion 77 is fixed on the top surface 78a of the above-mentioned base portion 78 on which guide pins 82 are also planted to guide the surface treating tape 6 into a predetermined position. The base portion 78 is securely fixed on the mount plate 75, which mount plate 75 is in turn supported on the slider portion 76 on the guide roller mount plate 51.

The slider portion 76 includes a guide rail 83, a slider plate 84 which is in engagement with the guide rail 83, and a cylinder member 85 which moves the slider plate 84.

The guide rail 83 consists of an elongated body of a predetermined width and laid in a direction perpendicular to the direction of tape travel. The slider plate 84 which is in engagement with the guide rail 83 is provided with a guide groove 83a of a width slightly greater than that of the guide rail 83 for engagement therewith. Thus, the slider plate 84 is slidable on and along the guide rail 83.

The cylinder portion 85 which moves the slider plate 84 normally consists of an ordinary air cylinder or the like, and mounted in parallel fashion with respect to the guide rail 83. The fore end of rod 86 of the cylinder portion 85 is attached to the mount plate 75 of the tape pressing member 74. Accordingly, upon supplying air to the air cylinder, the rod 86 is pushed out from the cylinder 85 to press the mount plate 75. Whereupon, the slider plate 84 is caused to slide along the guide rail 83, advancing in a direction perpendicular to the direction of tape travel. On the contrary, if air is drawn out of the cylinder 85, the rod 86 is retracted into the cylinder 85, pulling the mount plate 75 thereto. This causes the slider plate 84 to slide along the guide rail 83 and to move toward one longitudinal side surface 29d of the housing 29. Thus, the tape pressing member 74 on the slider plate 84 becomes slidable in a direction perpendicular to the path of the surface treating tape.

On the other hand, a stopper plate 87 is attached to an end face of the mount plate 75 on the side away from the above-mentioned process position, thereby to stop the tape pressing member 74 in a predetermined position. Namely, the tape pressing member 74 assumes the predetermined position when the stopper plate 87 comes into engagement with the end face of the guide rail 83. Further, for preventing collision of the tape pressing mechanism 28 against the housing 29, a notch 88 of substantially U-shape in section is provided in the side wall 29d of the housing 29 at a position confronting the stopper plate 87.

In this instance, the guide roller mount plate 51 which mounts the respective guide rollers and the tape pressing mechanism 28 is movable up and down within the opening 29b of the housing 29.

The guide roller mount plate 51 is supported by a slide post 89 which is provided on the bottom wall 29c of the housing 29. The slide post 89 includes guide bushes 90 and a guide post 91 which is movable up and down under guidance of the bushes 90. One of the bushes 90 is fixed on the bottom wall 29c of the housing 29, while the other one which is provided on the side of the guide roller mount plate 51 is securely fixed to the guide post 91 by a bolt or other suitable means. The guide post 91 is movable up and down in the guide bushes 90, and connected to the guide roller mount plate 51. Therefore, the guide roller mount plate 51 is movable up and down with the slide post 89. A post escape hole 92 is provided in the bottom wall 29c of the housing 29 in alignment with the guide post 91.

The guide roller mount plate 51 is supported on a cylinder 93 which moves the mount plate 51 up and down within the opening 29b of the housing 29. More specifically, the cylinder 93 is fixed on the bottom wall 29c of the housing 29, and has the fore end of its rod 94 fixed to the lower side 51b of the guide roller mount plate 51. The rod 94 is fixed to the guide roller mount plate 51 through a connecting member 95. Therefore, as soon as air is fed to the cylinder 93, the rod 94 is projected to push up the guide roller mount plate 51. Consequently, the guide roller mount plate 51 is lifted up toward the opening 29b of the housing 29 together with the guide post 91 which is guided by the bushes 90. On the contrary, if air is drawn out of the cylinder 93, the rod 94 is retracted into the cylinder 93, lowering the guide roller mount plate 51. Thus, the group of guide rollers and the tape pressing mechanism 28 are movable up and down in the opening 29b of the housing 29.

The guide roller mount plate 51 is provided with a level adjusting mechanism thereon for adjusting the guide rollers and the tape pressing mechanism 28 into positions in level with the tape travel position. The level adjusting mechanism includes a level adjusting bolt 98 threaded into a bolt holder member 97, which is fixed to the rear side 29c of the housing 29, and pressed against the main surface 51a of the guide roller mount plate 51 to determine the upper lifted position thereof. The level adjusting bolt 98 is adjustably threaded into a tapped hole in the bolt holder member 97 which is securely fixed to the rear side 29c of the housing 29. It follows that the upper lifted position of the guide roller mount plate 51 can be adjusted by varying the degree of the threaded engagement of the level adjusting bolt 98 with the tapped hole.

When the guide roller mount plate 51 is in a lower dead position, the group of guide rollers and the tape pressing mechanism 28 are held in the respective receded positions clear of the sliding tape drawing mechanism 26.

The surface treating machine with the above-described construction is further provided with a drive apparatus (omitted in the drawings) which moves up and down the machine as a whole during its surface treating operation.

Now, the operation by the above-described surface treating machine is explained with reference to FIGS. 8 through 11.

Figure 8:
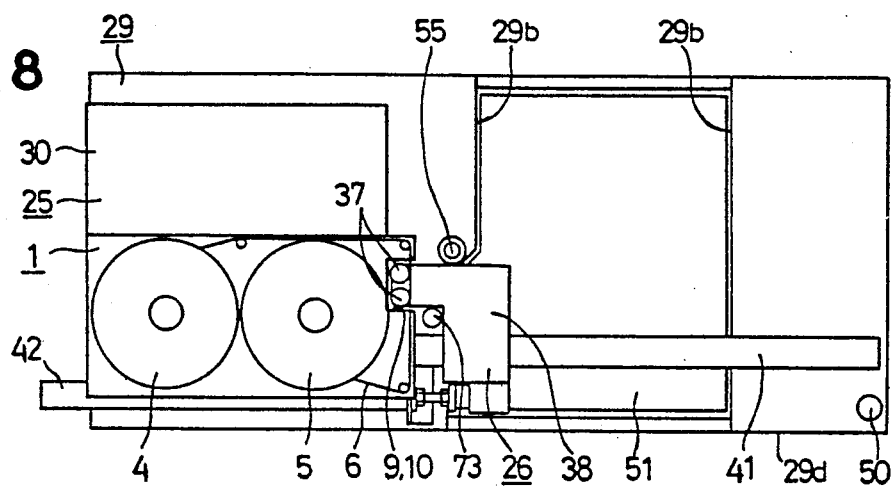
FIG. 8 is a schematic plan view of a cartridge mounted in position on the surface treating machine.

Firstly, as shown particularly in FIG. 8, a surface treating tape cartridge 1 of the above-described construction is placed and fixed on the cartridge mount plate 30. More specifically, the cartridge 1 is fixed in position by fitting the positioning pins 31 and the hub drive shafts 32 on the cartridge mount plate 30 into the positioning holes 12 and bladed portion insert holes 21 and 22 of the cartridge 1.

At this time, the loading rollers 37 are located in the notches 9 and 10 of the cartridge 1, and the guide roller mount plate 51 is in the lower dead position holding the respective guide rollers and the tape pressing mechanism 28 in the retracted positions in the opening 29b of the housing 29.

Figure 9:
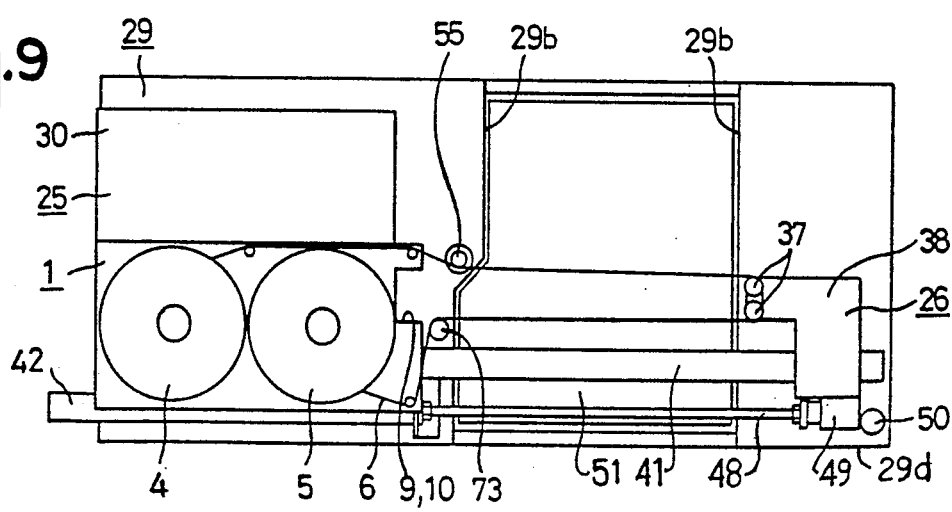
FIG. 9 is a schematic plan view of a surface treating tape drawn out of the cartridge.

Next, as shown in FIG. 9, the cylinder 42 of the loading roller slide means 39 is actuated to slide along the guide rail 41 the loading roller mount plate 38 which supports the loading rollers 37. As a result, the surface treating tape 6 is wrapped around the loading rollers 37 and pulled out of the cartridge 1. Then, the cylinder 42 is operated until the rod connecting member 49 on the loading roller mount plate 38 comes against the loading roller positioning member 50. Namely, the surface treating tape 6 assumes a predetermined loaded position when the loading rollers 37 are stopped in the outer position by the engagement of the rod connecting member 49 with the roller positioning member 50.

The surface treating tape 6 from the supply reel 5 is passed and turned around the paired loading rollers 37, through the third guide roller 73 which is provided on the main surface 29a of the housing 29, and wound up on the take-up reel 4 through the capstan 55 provided likewise on the main surface 29a of the housing 29.

At this time point, the guide roller mount plate 51 is still in the lower dead position, holding the group of guide rollers and the tape pressing mechanism 28 in the receded or lower positions in the opening 29b of the housing 29.

Figure 10:
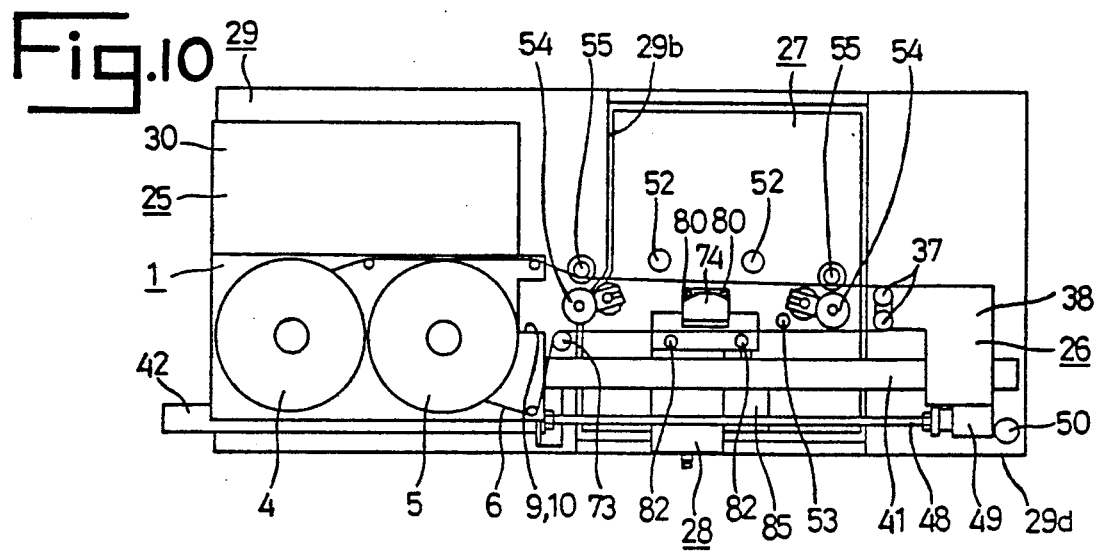
FIG. 10 is a view similar to FIG. 9 but showing a guide roller mount plate in lifted position.

Then, as shown particularly in FIG. 10, the guide rollers and the tape pressing mechanism 28 on the guide roller mount plate 51 are lifted up into the respective upper positions above the main surface 29a of the housing 29 within its opening 29b. Upon reaching the upper positions, the guide roller mounting plate 51 is stopped by the level adjusting bolt 98 on the housing 29 which comes into engagement with the bolt abutting portion 96 of the guide roller mount plate 51. Consequently, the group of guide rollers and the tape pressing mechanism 28 are located in the positions in level with the tape travel position.

In this phase of operation, the tape pressing mechanism 28 is in the receded position on the side of the side surface 29d of the housing 29.

Now, the first guide rollers 52 of the group of guide rollers and the capstans 55 are in protruded positions on the outer side or on the working side of the surface treating tape 6 which has been drawn out as described hereinbefore. On the other hand, the pinch rollers 54 and the second guide roller 53 are in protruded positions between the surface treating tape portions to and from the loading rollers. The pinch rollers 54 are turned and held in positions away from the capstans 55 by the pinch roller rocking means 68, and therefore they are kept free of contact with the surface treating tape 6.

At the same time, the tape pressing member 74 of the tape pressing mechanism 28 and the guide pins 80 located on the fore end portion of the pressing portion 77 of the tape pressing member 74 are in protruded positions between the afore-mentioned surface treating tape portions, while the guide pins 82 located on the base portion 78 of the tape pressing member 74 are in protruded positions on the outer side of the surface treating tape 6 or on the side away from the machining position.

In this state, the pinch rollers 54 are turned toward the capstans 55 by the pinch roller rocking means 68, thereby pressing the surface treating tape portion on the working side against the capstans 55.

Figure 11:
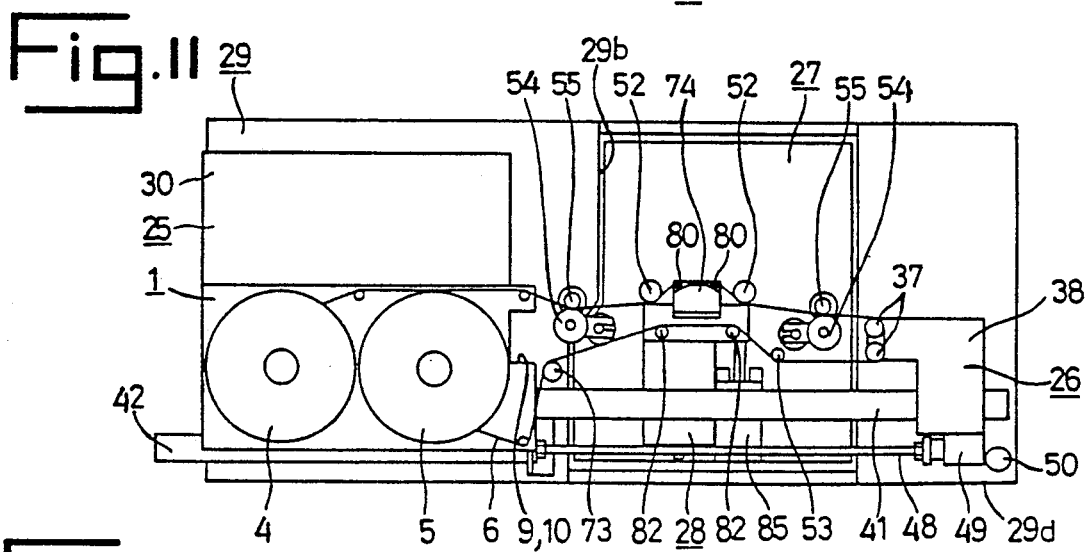
FIG. 11 is a view similar to FIG. 7 but showing a tape pressing member which is pressed against the surface treating tape.

Next, as shown particularly in FIG. 11, the cylinder 85 is actuated to slide along the guide rail 83 the plate 75 which mounts thereon the tape pressing member 74, shifting the latter into its operating position.

Consequently, the surface treating tape portion 6 on the side of the work is pulled forward by the guide pins 80 planted on the tape pressing member 74, while the other surface treating tape portion 6 is pulled forward by the guide pins 82 located on the base portion 78 of the tape pressing member 74. The tape pressing member 74 is stopped as soon as the stopper plate 87 on the end face of the mount plate 75 is pressed against the end face of the guide rail 83. The surface treating tape 6 is now threaded and set in position as shown in FIG. 11.

After loading the surface treating tape 6, the rotational drives for the capstans 55 and the hub of the take-up reel 4 are actuated. Whereupon, the surface treating tape 6 which is pressed by the pinch rollers 54 is fed forward. Namely, the surface treating tape 6 is fed from the supply reel 5, and transported around the third guide roller 73 planted on the main surface 29a of the housing 29, the guide pins 82 planted on the base portion 78 of the tape pressing member 74, and the second guide roller 53, and then turned back around the paired loading rollers 37. The surface treating tape past the loading rollers 37 is transported between the capstan 55 on the tape-drawing side and the pinch roller 54 and around one of the first guide rollers 52 located at the treating position, one of the guide pins 80 planted on the tape pressing member 74, and the other guide pin 80, the other one of the first guide rollers 52, and then between the capstan 55 and the pinch roller 54 mounted on the side of the cartridge 1.

Figure 6:
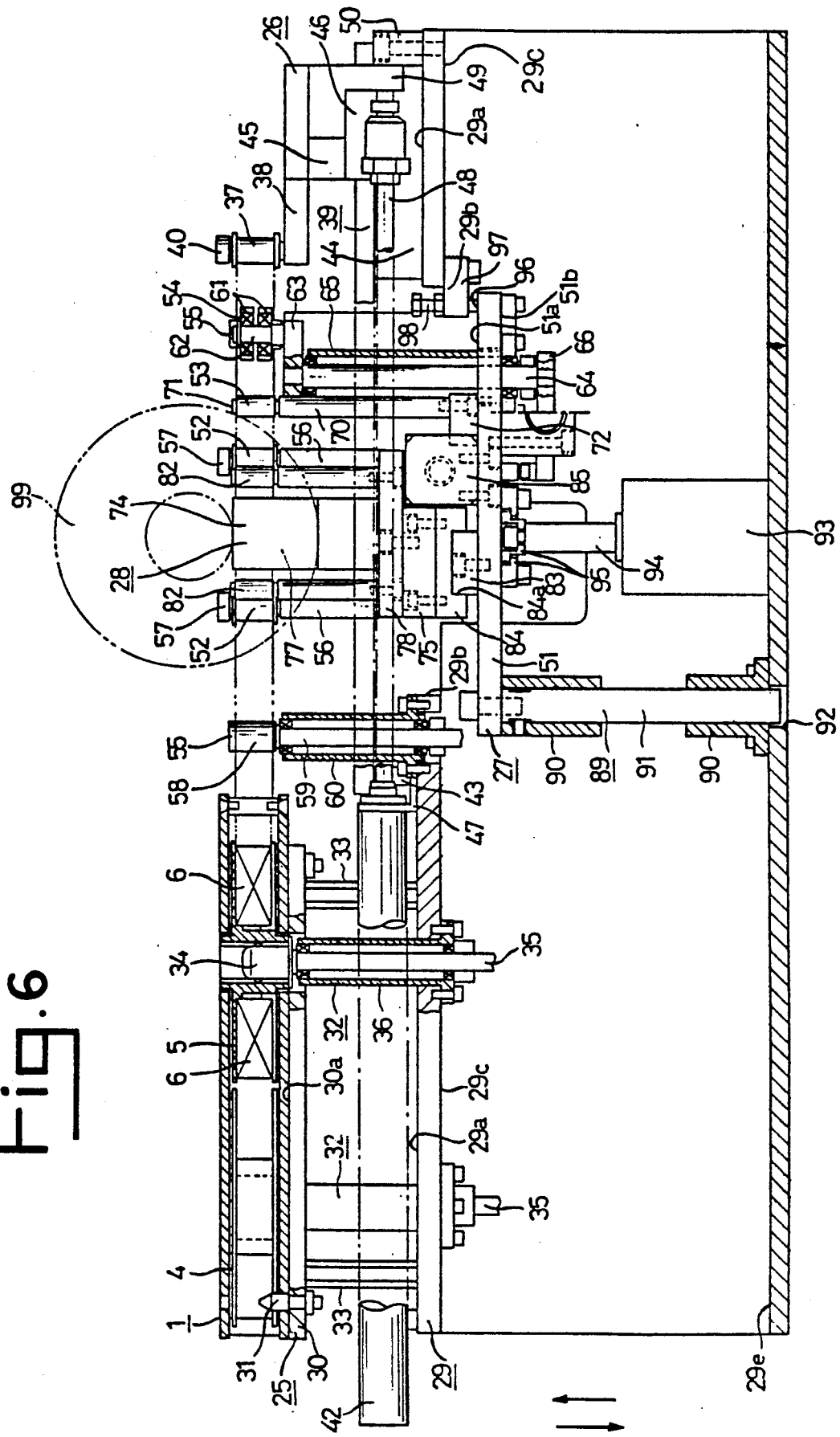
FIG. 6 is a partly sectioned side view of the surface treating machine.
Figure 7:
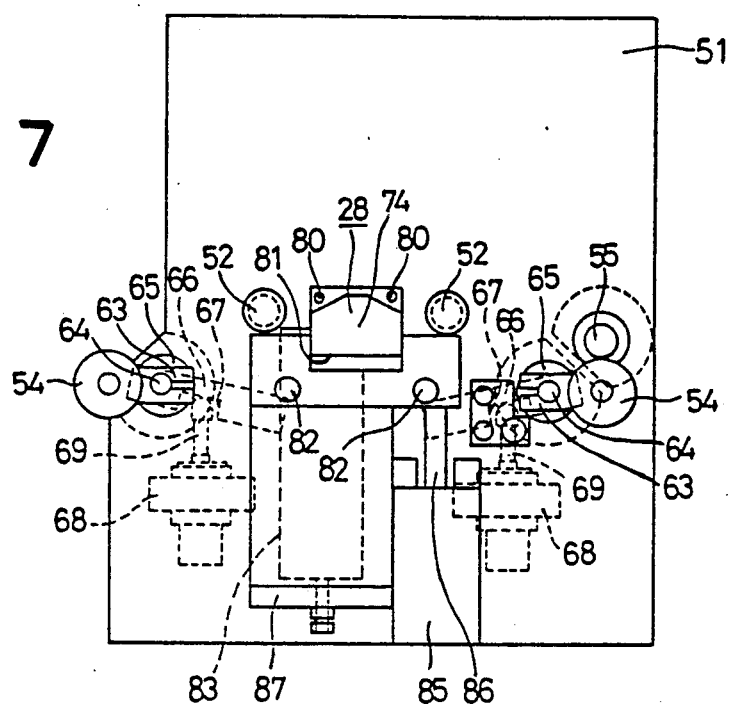
FIG. 7 is a plan view of a guide roller unit section.

In the next place, as shown in FIG. 6, the machine as a whole is moved up and down by a driving apparatus (not shown), while the surface treating tape 6 is held in position overlapping the surface of a work 99, for example, a base film or a substrate of magnetic disk like hard disk or floppy disk, which is mounted on a substrate holder (not shown). The workpiece 98 on the substrate holder is put in rotation about its axis by a rotational drive shaft of the holder during the surface treatment.

Then, the tape pressing member 74 starts to blow air from its air holes to press the surface treating tape 6 on the surface of the work 99 with air blasts of predetermined pressure. Consequently, the surface of the work 99 is processed by the travelling surface treating tape 6. For instance, when a lapping tape used as the surface treating tape 6, the surface of the work such as a magnetic disk substrate or base film is lapped by the tape. In a case using a cleaning or wiping tape as the surface treating tape 6, the polishing powder or the like which remains on the surfaces of magnetic disk substrates or base films after a surface finishing operation is cleaned off by the tape. During the surface treating operation, the machine as a whole is moved up and down to press the surface treating tape 19 over the entire surface of a work 99.

Upon completing the surface treatment of the work 99, the above-described operations are carried out in an inverse order, withdrawing the unreeled lapping tape 6 into the cartridge 1.

More specifically, the air blasting from the tape presisng member 74 as well as the rotation of the capstans 55 is stopped. Then, the cylinder 85 of the tape pressing member 74 is operated to slide back the latter along the guide rail 83 toward the side surface 29d of the housing 29. As a result, the guide pins 80 and 82 on the tape pressing member 74 are disengaged from the surface treating tape 6 and returned to the positions shown in FIG. 10.

Next, the pinch roller rocking means 68 is operated in a direction of disengaging the pinch rollers 54 from the capstans 55, thus releasing the surface treating tape 6 therefrom. Then, the cylinder 93 which imparts upward and downward movements to the guide roller mount plate 51 is operated to lower the latter. By so doing, the group of guide rollers and the tape pressing mechanism 28 on the guide roller mount plate 51 are lowered and receded into the opening 29b of the housing 29 to assume the positions shown in FIG. 9.

The cylinder 42 of the loading roller sliding means 39 is then operated to slide the loading roller mount plate 38 along the guide rail 41 toward the cartridge 1. Simultaneously, the hub drive shaft 32 of the take-up reel 4 is actuated to wind thereon the surface treating tape portion which has been unreeled for the surface treating operation.

The unreeled portion of the surface treating tape 6 is completely wound on the take-up reel 4 in the cartridge 1 as soon as the loading rollers 37 on the loading roller mount plate 38 are inserted into the notches or indented portions 9 and 10 of the surface treating tape cartridge 1.

Although the surface treating machine according to the present invention has been described by way of a preferred embodiment, it is possible for those skilled in the art to add various alterations or modifications thereto without departing from the scope of the invention as defined in the claims.

Figure 12:
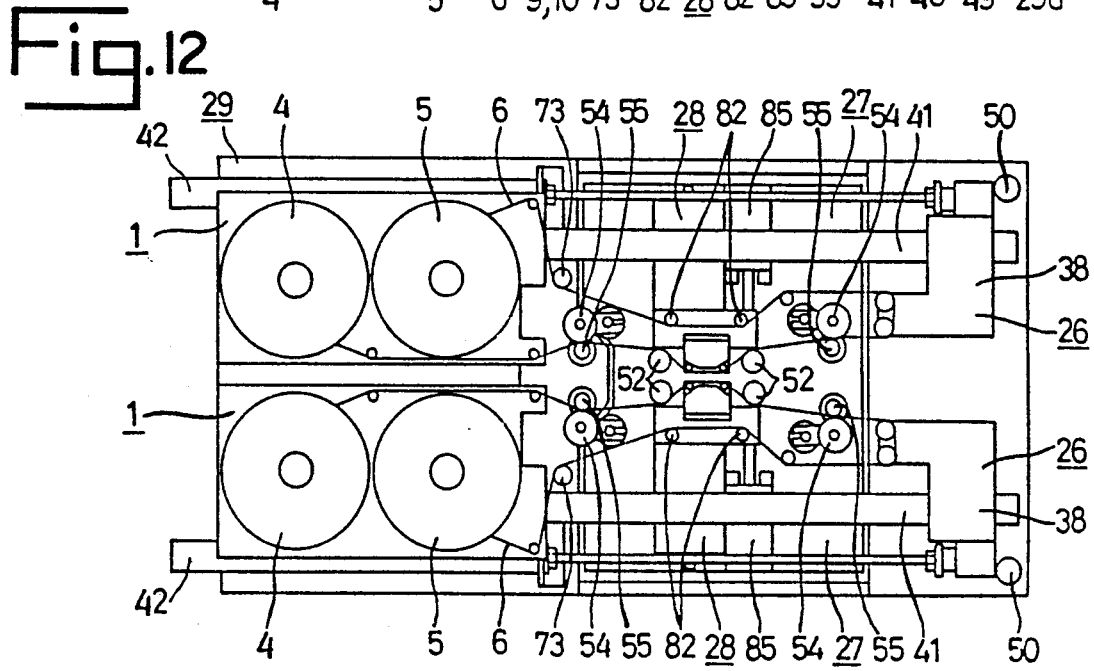
FIG. 12 is a schematic plan view of another surface treating machine incorporating the present invention.

For instance, the surface treating machine which is arranged to grind or clean only one side of a magnetic disk substrate or base film in the foregoing embodiment may be modified to treat both sides of the work by providing counterparts of the cartridge holder 25, tape drawing mechanism 26, guide roller mechanism 25 and tape pressing mechanism 28 symmetrically on the housing 29 as illustrated in FIG. 12.

Needless to say, further improvements in working efficiency and productivity can be attained by such simultaneous grinding or cleaning of the opposite faces of a magnetic disk substrate or base film.

In addition to the circular magnetic disk substrates and base films, the above-described machine of the invention is also useful for the surface treatment of works in the form of a tape or the like. For example, the surface treatment of an elongated tape-like base film is possible by the use of a suitable transport means which is arranged to move the base film in parallel relation with the surface treating tape while pressing the surface treating tape against the base film in the manner as described hereinbefore. Of course, the opposite sides of a tape-like work can also be treated simultaneously if desired.

It will be appreciated from the foregoing description that the surface treating tape cartridge according to the invention has a pair of tape reels carrying a surface treating tape packaged in a cartridge casing to permit easy handling of surface treating tapes as well as facilitated storage and administration of the tapes.

Besides, with the surface treating machine according to the invention, the operator is required only to place a surface treating tape cartridge on the cartridge holder since the tape is automatically drawn out from the cartridge and set in a predetermined position or a path of travel by a group of guide rollers, ready for a surface treating operation.

Thus, the present invention has achieved automation of the surface treating tape loading operation, obviating the conventional tape setting operation which is very troublesome.

It follows that the operator can set a surface treating tape in position in an extremely simplified manner without any troublesome manual efforts. In addition, the automation contributes to the improvement of working efficiency of the surface treating operation, enhancing the productivity of the machine all the more.

What is claimed is:

1. A surface treating machine employing a surface treating tape cartridge, said machine comprising:
    a surface treating tape cartridge having a casing composed of separably joined upper and lower halves, and a pair of reels carrying a winding of surface treating tape and rotatably accommodated between said upper and lower halves of said casing;
    a cartridge holder for holding said surface treating tape cartridge fixedly in position on said machine;
    a tape drawing mechanism adapted to draw out part of said surface treating tape in said cartridge to a predetermined position;
    a guide roller mechanism for setting and transporting said surface treating tape in a predetermined path of travel through a work treating position;
    a tape pressing mechanism for pressing said surface treating tape against a work at said treating position, said tape pressing mechanism comprising a tape pressing member for pressing said surface treating tape against the surface of said work, a base plate mounting said tape pressing member thereon, and a slider portion for sliding said base plate toward and away from said treating position, wherein said tape pressing member is provided with a pressing portion having a pair of guide pins mounted on the forward end portion thereof for pressing said surface treating tape uniformly against the surface of said work, and a base portion fixedly mounted on said base plate, wherein the pressing portion is provided with air holes, and means to blow air blasts against said surface treating tape in said treating position through said air holes in a direction perpendicular to the tape face.

2. A surface treating machine as defined in claim 1, wherein said cartridge holder and said tape drawing mechanism are mounted on a main surface of a rectangular housing, said guide roller mechanism and said tape pressing mechanism are supported vertically movably within an opening provided in a center portion of said housing.

3. A surface treating machine as defined in claim 2, wherein said cartridge holder comprises a cartridge mount plate in level with said path of tape travel, positioning pins fixedly planted on said cartridge holder for securely holding said cartridge thereon, and a pair of hub drive shafts projected through said cartridge mount plate for engagement with hub portions of said tape reels, and said tape cartridge is provided with positioning holes to be fit in said positioning pins on said cartridge mount plate.

4. A surface treating machine as defined in claim 2, wherein said tape drawing mechanism comprises a pair of loading rollers, a loading roller mount plate rotatably supporting said loading rollers thereon, and a sliding means for sliding said loading roller mount plate toward and away from said cartridge holder, and said tape cartridge is provided with an indented portion at one side of said casing to receive said loading rollers therein.

5. A surface treating machine as defined in claim 4, wherein said sliding means comprises a guide rail for sliding said loading roller mount plate therealong, and a cylinder for moving said loading roller mount plate to and from a predetermined position on said guide rail.

6. A surface treating machine as defined in claim 2, wherein said guide roller mechanism comprises a group of guide rollers for transporting said surface treating tape along said predetermined path of travel, and a guide roller mount plate supporting said group of guide rollers thereon.

7. A surface treating machine as defined in claim 6, wherein said group of guide rollers comprises at least a pair of first guide rollers, a second guide roller, a pair of pinch rollers and a capstan in predetermined positions on said guide roller mount plate.

8. A surface treating machine as defined in claim 7, wherein said first guide rollers are located at a distance from each other on the opposite sides of a machining position where said work is treated by said surface treating tape, said capstan is located on one side of the path of travel of the drawn-out tape advancing toward a treating from said loading rollers, and said pinch rollers are located opposingly to said capstan and a second capstan located on one side of the path of travel of said surface treating tape moving toward said cartridge past said treating position and swingable toward said capstans to press said surface treating tape thereto.

9. A surface treating machine as defined in claim 2, wherein said base portion has guide pins planted thereon to guide said surface treating tape into a predetermined path of travel.

10. A surface treating machine as defined in claim 2, wherein said slider portion comprises a guide rail, a slide plate slidable on and along said guide rail, and a cylinder for sliding said slide plate toward and away from said treating position.

11. A surface treating machine as defined in claims 6, 7, 8, 9, or 10, wherein said guide roller mount plate mounting said group of guide rollers and said tape pressing mechanism is supported on a cylinder and vertically movable between a sunken position within said opening in said housing and a raised position holding said guide rollers and tape pressing mechanism in level relation with said path of tape travel.

12. A surface treating machine as defined in claim 11, wherein the raised position of said guide roller mount plate is adjustable by way of a level adjusting bolt abutted on said guide roller mounted plate through a tapped member on the side of said housing.

13. A surface treating machine employing a surface treating tape cartridge, said machine comprising:
a surface treating tape cartridge having a casing composed of separably joined upper and lower halves, and a pair of reels carrying a winding of surface treating tape and rotatably accommodated between the upper and lower halves of said casing;
a cartridge holder for holding said surface treating tape cartridge fixedly in position on said machine;
a tape drawing mechanism adapted to draw out part of said surface treating tape in said cartridge to a predetermined position;
a guide roller mechanism for setting and transporting said surface treating tape in a predetermined path of travel through a work treating position;
a tape pressing mechanism for pressing said surface treating tape against a work at said treating position; said cartridge holder and said tape drawing mechanism being mounted on a main surface of a housing, said guide roller mechanism and said tape pressing mechanism being supported in vertically movable relation within an opening provided in a center portion of said housing, wherein the tape drawing mechanism comprises a pair of loading rollers, a loading roller mount plate rotatably supporting said loading rollers thereon, and sliding means for sliding said loading roller mount plate toward and away from said cartridge holder, said tape cartridge being provided with an indented portion at one side of said casing to receive said loading rollers therein, wherein said sliding means comprises a guide rail for sliding said loading roller mount plate therealong, and a power cylinder for moving said loading roller mount plate to and from a predetermined position on said guide rail.

14. The surface treating machine of claim 13 in which said guide roller mechanism comprises a group of guide rollers for transporting said surface treating tape along said predetermined path of travel, and a guide roller mount plate supporting said group of guide rollers thereon, wherein said group of guide rollers comprises at least a pair of said first guide rollers, a second guide roller, a pair of pinch rollers, and a capstan in predetermined positions on said guide roller mount plate.

15. The surface treating machine of claim 14, wherein said first guide rollers are located at a distance from each other on the opposite sides of a machining position where said work is treated by said surface treating tape, said capstan is located on one side of the path of travel of the drawn-out tape advancing toward a treating position from said loading rollers, and said pinch rollers are located opposingly to said capstan and a second capstan located on one side of the path of travel of said surface treating tape moving toward said cartridge past said treating position and swingable toward said capstans to press said surface treating tape thereto.

16. A surface treating machine employing a surface treating tape cartridge, said machine comprising:
a surface treating tape cartridge having a casing composed of separably joined upper and lower halves, and a pair of reels carrying a winding of surface treating tape and rotatably accommodated between said upper and lower halves of said casing;
a cartridge holder for holding said surface treating tape cartridge fixedly in position on said machine;
a tape drawing mechanism adapted to draw out part of said surface treating tape in said cartridge to a predetermined position;
a guide roller mechanism for setting and transporting said surface treating tape in a predetermined path of travel through a work treating position;
a tape pressing mechanism for pressing said surface treating tape against a work at said treating position, said tape pressing mechanism comprising a tape pressing member for pressing said surface treating tape against the surface of said work, a base plate mounting said tape pressing member thereon, and a slider portion for sliding said base plate toward and away from said treating position, wherein said tape pressing member is provided with a pressing portion having a pair of guide pins mounted on the forward end portion thereof for pressing said surface treating tape uniformly against the surface of said work, and a base portion fixedly mounted on said base plate, wherein the base portion has guide pins planted thereon to guide said surface treating tape into a predetermined path of travel.

17. A surface treating machine employing a surface treating tape cartridge, said machine comprising:

a surface treating tape cartridge having a casing composed of separably joined upper and lower halves, and a pair of reels carrying a winding of surface treating tape and rotatably accommodated between said upper and lower halves of said casing;

a cartridge holder for holding said surface treating tape cartridge fixedly in position on said machine;

a tape drawing mechanism adapted to draw out part of said surface treating tape in said cartridge to a predetermined position;

a guide roller mechanism for setting and transporting said surface treating tape in a predetermined path of travel through a work treating position;

a tape pressing mechanism for pressing said surface treating tape against a work at said treating position, said tape pressing mechanism comprising a tape pressing member for pressing said surface treating tape against the surface of said work, a base plate mounting said tape pressing member thereon, and a slider portion for sliding said base plate toward and away from said treating position, wherein said tape pressing member is provided with a pressing portion having a pair of guide pins mounted on the forward end portion thereof for pressing said surface treating tape uniformly against the surface of said work, and a base portion fixedly mounted on said base plate, wherein said slider portion comprises a guide rail, a slide plate slidable on and along said guide rail, and a power cylinder for driving said slide plate toward and away from said treating position.

* * * * *